US012799912B2

(12) United States Patent
Matsuda

(10) Patent No.: US 12,799,912 B2
(45) Date of Patent: Nov. 17, 2026

(54) INTERNAL COMBUSTION ENGINE SYSTEM, VEHICLE INCLUDING SAME, AND METHOD OF SUPPLYING FUEL GAS

(71) Applicant: KAWASAKI MOTORS, LTD., Akashi (JP)

(72) Inventor: Yoshimoto Matsuda, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/859,120

(22) PCT Filed: May 31, 2023

(86) PCT No.: PCT/JP2023/020206
§ 371 (c)(1),
(2) Date: Oct. 22, 2024

(87) PCT Pub. No.: WO2023/243404
PCT Pub. Date: Dec. 21, 2023

(65) Prior Publication Data

US 2025/0297587 A1 Sep. 25, 2025

(30) Foreign Application Priority Data

Jun. 13, 2022 (JP) ................................. 2022-094861

(51) Int. Cl.
*F02M 21/02* (2006.01)

(52) U.S. Cl.
CPC .... *F02M 21/0245* (2013.01); *F02M 21/0218* (2013.01); *F02M 21/0239* (2013.01)

(58) Field of Classification Search
CPC ........... F02M 21/0245; F02M 21/0218; F02M 21/0239
See application file for complete search history.

(56) References Cited

U.S. PATENT DOCUMENTS 7,140,354 B1 * 11/2006 Hashemi ............... F02D 19/027 123/456
2014/0261304 A1 9/2014 McAlister et al.
2015/0307075 A1 10/2015 Leone
(Continued)

FOREIGN PATENT DOCUMENTS

CA 2505455 A1 7/2005
DE 102008029493 A1 12/2009
(Continued)

OTHER PUBLICATIONS

Tsurutani, K. et al., "Fuel Feed System for Cylinder Direct Injection Gas Fuel Engine," Toyota Technical Publications, No. 13656, Jun. 28, 2002, 4 pages. Submitted with English translation of International Search Report Issued in Application No. PCT/JP2023/020206 for explanation of relevance.
(Continued)

*Primary Examiner* — Syed O Hasan
(74) *Attorney, Agent, or Firm* — Alleman Hall LLP

(57) ABSTRACT

An internal combustion engine system includes: an internal combustion engine; at least one fuel tank that stores a fuel gas in a compressed state; a fuel gas pipe that connects the fuel tank to the internal combustion engine; and a pressurizing pump that is connected to the fuel gas pipe and pressurizes the fuel gas in the fuel tank or in the fuel gas pipe.

15 Claims, 10 Drawing Sheets

(56) References Cited

U.S. PATENT DOCUMENTS

| | | | | |
|---|---|---|---|---|
| 2016/0245217 | A1 | 8/2016 | Takeuchi et al. | |
| 2021/0301775 | A1* | 9/2021 | Puran .................. | F02M 21/023 |
| 2021/0372350 | A1 | 12/2021 | Seba et al. | |

FOREIGN PATENT DOCUMENTS

| | | | |
|---|---|---|---|
| DE | 102017205910 | A1 | 10/2018 |
| DE | 102018215847 | A1 | 3/2020 |
| EP | 4497939 | A1 | 1/2025 |
| JP | H0633836 | A | 2/1994 |
| JP | 2002256980 | A | 9/2002 |
| JP | 2004353458 | A | 12/2004 |
| JP | 2006125220 | A | 5/2006 |
| JP | 2008038680 | A | 2/2008 |
| JP | 2012117495 | A | 6/2012 |
| JP | 2018119478 | A | 8/2018 |
| JP | 2021173182 | A | 11/2021 |
| WO | 2011053164 | A1 | 5/2011 |
| WO | 2021165880 | A1 | 8/2021 |
| WO | 2022266769 | A1 | 12/2022 |

OTHER PUBLICATIONS

ISA Japan Patent Office, International Search Report Issued in Application No. PCT/JP2023/020206, Aug. 8, 2023, WIPO, 3 pages.

* cited by examiner

INTERNAL COMBUSTION ENGINE SYSTEM, VEHICLE INCLUDING SAME, AND METHOD OF SUPPLYING FUEL GAS

CROSS REFERENCE TO RELATED APPLICATIONS

This application is a national phase application of International Application No. PCT/JP2023/020206, filed on May 31, 2023, entitled INTERNAL COMBUSTION ENGINE SYSTEM, VEHICLE PROVIDED WITH SAME, AND FUEL GAS SUPPLY METHOD which in turn claims priority to Japanese Patent Application No. 2022-094861, filed on Jun. 13, 2022, the entire disclosures of each of which are incorporated herein by reference for all purposes.

TECHNICAL FIELD

The present disclosure relates to an internal combustion engine system, a vehicle including the internal combustion engine system, and a method of supplying fuel gas.

BACKGROUND ART

PTL 1 discloses an internal combustion engine that combusts a hydrogen gas, supplied from a high-pressure hydrogen gas tank through a pressure reducing valve, as fuel to generate driving power.

CITATION LIST

Patent Literature

PTL 1: Japanese Laid-Open Patent Application Publication No. 2021-173182

SUMMARY OF INVENTION

Technical Problem

When a fuel gas in a fuel tank is continuously consumed by the operation of an internal combustion engine, internal pressure of the fuel tank finally lowers to less than a predetermined value. In this state, the fuel gas in the fuel tank cannot be appropriately supplied to the internal combustion engine, and the fuel tank is regarded as being out of the fuel.

An object of one aspect of the present disclosure is to increase the amount of fuel gas supplied to an internal combustion engine.

Solution to Problem

An internal combustion engine system according to one aspect of the present disclosure includes: an internal combustion engine; at least one fuel tank that stores a fuel gas in a compressed state; a fuel gas pipe that connects the fuel tank to the internal combustion engine; and a pressurizing pump that is connected to the fuel gas pipe and pressurizes the fuel gas in the fuel tank or in the fuel gas pipe.

A vehicle according to one aspect of the present disclosure includes the internal combustion engine system and moves by driving power generated by the internal combustion engine system.

A method of supplying a fuel gas according to one aspect of the present disclosure includes: supplying to a fuel gas consuming source the fuel gas of one of two channels which is higher in pressure; pressurizing by a pressurizing pump the fuel gas of one of the two channels which is lower in pressure; and supplying the pressurized fuel gas to the fuel gas consuming source.

Advantageous Effects of Invention

According to one aspect of the present disclosure, even when the pressure of the fuel gas in the fuel tank lowers, the fuel gas can be pressurized by the pressurizing pump. Therefore, even when the internal pressure of the fuel tank lowers, the fuel gas can be supplied to the consuming source.

DESCRIPTION OF EMBODIMENTS

Hereinafter, embodiments will be described with reference to the drawings.

Embodiment 1

Figure 1:
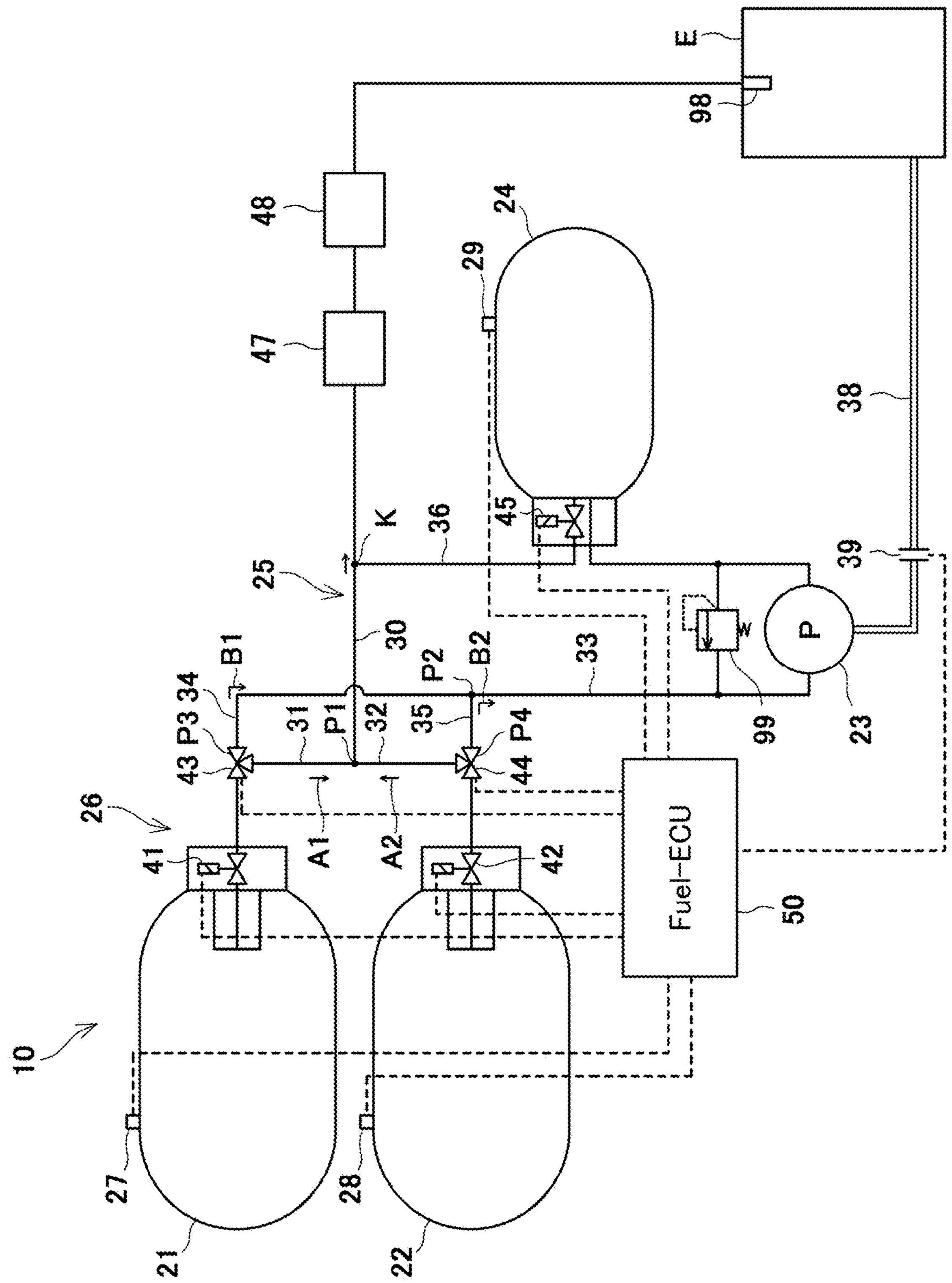
FIG. 1 is a block diagram of an internal combustion engine system of a vehicle according to Embodiment 1.

FIG. 1 is a block diagram of an internal combustion engine system 10 according to Embodiment 1. As shown in FIG. 1, the internal combustion engine system 10 includes an internal combustion engine E, a first fuel tank 21, a second fuel tank 22, a pressurizing pump 23, an auxiliary tank 24, a fuel gas pipe 25, a valve system 26, a first fuel tank pressure sensor 27, a second fuel tank pressure sensor 28, an auxiliary tank pressure sensor 29, a pressure reducing valve 47, a shutoff valve 48, a fuel ECU 50, and the like. The fuel gas pipe 25 and the valve system 26 constitute a fuel supply circuit system. The fuel gas pipe 25 and the pressurizing pump 23 constitute a fuel supply apparatus. In the present embodiment, the internal combustion engine system 10 is mounted on a vehicle 1. The vehicle 1 is not especially limited, and examples of the vehicle 1 may include automatic two-wheeled vehicles, automatic three-wheeled vehicles, off-road four-wheeled vehicles, water vehicles, aircrafts, and railcars. The vehicle 1 outputs propulsive power and therefore moves by the driving power generated by the internal combustion engine system 10.

The internal combustion engine E combusts a fuel gas, converts its combustion energy into rotational energy, and outputs the rotational energy. In the present embodiment, the internal combustion engine is a reciprocating engine. In this case, the internal combustion engine explodes the fuel gas in a cylinder to generate a reciprocating movement of a piston by the expansion of a gas in the cylinder. The internal combustion engine converts the reciprocating movement of the piston into a rotational movement of a crank shaft and outputs the rotational movement. The fuel gas combusted by the internal combustion engine E is, for example, a hydrogen gas. To be specific, the internal combustion engine E is a hydrogen gas consuming source. The internal combustion engine E needs to be supplied with the hydrogen gas having predetermined fuel injection pressure higher than standard pressure (0.1 MPa). In a case where a direct injection engine that supplies the fuel gas when the gas in the cylinder is in a compressed state by the piston is used as the internal combustion engine E, the internal combustion engine E needs to be supplied with the hydrogen gas that has been compressed to have, for example, 10 MPa or more.

The first fuel tank 21 and the second fuel tank 22 are the same in structure as each other. The first fuel tank 21 and the second fuel tank 22 store the hydrogen gas as the fuel gas in a compressed state. Each of the internal pressure of the first fuel tank 21 in a full state and the internal pressure of the second fuel tank 22 in a full state is higher than the standard pressure (0.1 MPa), and specifically, adequately higher than the fuel injection pressure required for the internal combustion engine E. The internal pressure of the first fuel tank 21 in a full state is higher than opening pressure of a regulator located at the tank 21, and the internal pressure of the second fuel tank 22 in a full state is higher than opening pressure of a regulator located at the tank 22. For example, the pressure of the hydrogen gas filled in the fuel tank is set to 70 MPa.

The pressurizing pump 23 can pressurize the hydrogen gas having flowed out to a pipe from an outlet port of the first fuel tank 21 or the second fuel tank 22. The auxiliary tank 24 stores the hydrogen gas which has been pressurized by the pressurizing pump 23. In the present embodiment, the auxiliary tank 24 is smaller than each fuel tank. The pressurizing pump 23 can adopt a known structure as long as it can pressurize the hydrogen gas to pressure that exceeds the fuel injection pressure required for the internal combustion engine E. For example, the pressurizing pump may be realized by a reciprocating pump, a diaphragm pump, or the like, which uses the reciprocating movement of a piston. The pressurizing pump 23 may be realized by a booster pump, a roots pump, a plunger pump, or the like, which uses the rotational movement of a shaft.

In the present embodiment, the pressurizing pump 23 is driven by utilizing the energy generated by the internal combustion engine E. The pressurizing pump 23 is mechanically driven by the internal combustion engine E. In the present embodiment, the rotational power of a rotary member that rotates in accordance with the driving of the internal combustion engine is supplied to the pressurizing pump 23 as the driving power for the pressurizing pump 23. The rotary member of the internal combustion engine may be a rotating shaft, such as a crank shaft, a camshaft, or a balancer shaft. The rotary member that supplies the driving power to the pressurizing pump 23 may be an output shaft of a transmission connected to the internal combustion engine. For example, the pressurizing pump 23 may be connected to the rotary member of the internal combustion engine E through a power transmitting structure 38. The power transmitting structure 38 may include a gear mechanism, a belt-pulley mechanism, or a chain-sprocket mechanism. The pressurizing pump 23 may be directly connected to the crank shaft of the internal combustion engine E.

For example, like a roots pump, rotational power may be used as driving power in the pressurizing pump 23. In this case, the pressurizing pump 23 is supplied with rotational driving power from the power transmitting structure 38 or the rotary member to pressurize the hydrogen gas sucked through a suction port and discharge the hydrogen gas through a discharge port. For example, like a reciprocating pump, reciprocating power may be used as driving power in the pressurizing pump 23. In this case, the pressurizing pump 23 is supplied with the reciprocating power, obtained by converting the rotational driving force, through a cam mechanism to pressurize the hydrogen gas sucked through the suction port and discharge the hydrogen gas through the discharge port. A specific example may be such that: the crank shaft includes a cam nose; the rotation of a cam is converted into the reciprocating movement; and the piston is made to reciprocate.

In the present embodiment, a clutch 39 that can be driven by an actuator is located at a power transmitting path extending between the crank shaft of the internal combustion engine E and the pressurizing pump 23. To be specific, the clutch 39 can be controlled by the fuel ECU 50. A relief valve 99 may be located at a discharge side of the pressurizing pump 23. In this case, when pressure in a passage at the discharge side of the pressurizing pump 23 exceeds predetermined relief pressure, the relief valve 99 makes the passage at the discharge side of the pressurizing pump 23 and a passage at a suction side of the pressurizing pump 23 communicate with each other. Thus, the pressure in the passage at the discharge side of the pressurizing pump 23 can be prevented from exceeding the relief pressure. For example, the relief pressure is set higher than the predetermined fuel injection pressure of the internal combustion engine E and is set lower than filling upper limit pressure of each of the fuel tanks 21 and 22. Both of the relief valve 99 and the clutch 39 may be included, or only one of the relief valve 99 and the clutch 39 may be included.

The fuel gas pipe 25 connects the first fuel tank 21 and the second fuel tank 22 to the internal combustion engine E. The fuel gas pipe 25 includes a main supply pipe 30, a first sub-supply pipe 31, a second sub-supply pipe 32, a main pressurizing pipe 33, a first sub-pressurizing pipe 34, a second sub-pressurizing pipe 35, and an auxiliary pipe 36. The main supply pipe 30 is connected to the first sub-supply pipe 34 and the second sub-supply pipe 35 at a first connection portion P1. The main supply pipe 30 extends from the first connection portion P1 to a fuel injector 98 of the internal combustion engine E. The first sub-supply pipe 31 connects the first fuel tank 21 to the main supply pipe 30. In other words, the first sub-supply pipe 31 extends from the first fuel tank 21 to the first connection portion P1. The second sub-supply pipe 32 connects the second fuel tank 22 to the main supply pipe 30. In other words, the second sub-supply pipe 32 extends from the second fuel tank 22 to the first connection portion P1. To be specific, the first sub-supply pipe 31 and the second sub-supply pipe 32 respectively extend toward the tanks 21 and 22 from the first connection portion P1 that is an upstream end of the main supply pipe 30.

The first sub-pressurizing pipe 34 is connected to an intermediate portion of the first sub-supply pipe 31 at a third connection portion P3. The second sub-pressurizing pipe 35 is connected to an intermediate portion of the second sub-supply pipe 32 at a fourth connection portion P4. The first sub-pressurizing pipe 34 and the second sub-pressurizing pipe 35 are connected to the main pressurizing pipe 33 at a second connection portion P2. In other words, the first sub-pressurizing pipe 34 extends from the third connection portion P3 to the second joining point P2, and the second sub-pressurizing pipe 35 extends from the fourth connection portion P4 to the second connection portion P2. The main pressurizing pipe 33 connects the second connection portion P to an inlet port of the auxiliary tank 24. The pressurizing pump 23 is located at an intermediate portion of the main pressurizing pipe 33. The suction port of the pressurizing pump 23 is connected to a portion of the main pressurizing pipe 33 which extends from the second connection portion P2. The discharge port of the pressurizing pump 23 is connected to a portion of the main pressurizing pipe 33 which extends toward the auxiliary tank 24. The first sub-pressurizing pipe 34 and the second sub-pressurizing pipe 35 respectively extend toward the tanks 21 and 22 from the second connection portion P2 that is an upstream end of the main pressurizing pipe 33. The auxiliary pipe 36 connects the auxiliary tank 24 to the main supply pipe 30. The auxiliary pipe 36 extends from an outlet port of the auxiliary tank 24 to a joining connection portion K of the main supply pipe 30. The joining connection portion K is located downstream of the first connection portion P1 and upstream of the pressure reducing valve 47.

A channel of the first sub-supply pipe 31 and a channel of the main supply pipe 30 constitute a first internal combustion engine channel A1 (21, 31, P1, 30) extending from the first fuel tank 21 toward the internal combustion engine E. A channel of the second sub-supply pipe 32 and a channel of the main supply pipe 30 constitute a second internal combustion engine channel A2 (22, 32, P1, 30) extending from the second fuel tank 22 toward the internal combustion engine E. A channel of the first sub-supply pipe 31, a channel of the first sub-pressurizing pipe 34, and a channel of the main pressurizing pipe 33 constitute a first pump channel B1 (21, 31, P3, 34, P2, 33, 36, K, 30) extending from the first fuel tank 21 through the pressurizing pump 23 toward the internal combustion engine E. A channel of the second sub-supply pipe 32, a channel of the second sub-pressurizing pipe 35, and a channel of the main pressurizing pipe 33 constitute a second pump channel B2 (22, 32, P4, 34, P2, 33, 36, K, 30) extending from the second fuel tank 22 through the pressurizing pump 23 toward the internal combustion engine.

The valve system 26 includes a first fuel tank on-off valve 41, a second fuel tank on-off valve 42, a first switching valve 43, a second switching valve 44, and an auxiliary tank on-off valve 45. The valves 41 to 45 are electromagnetic valves that are electrically controllable. The first fuel tank on-off valve 41 is located at the first fuel tank 21 and opens and closes the outlet port of the first fuel tank 21. The second fuel tank on-off valve 42 is located at the second fuel tank 22 and opens and closes the outlet port of the second fuel tank 22.

The first switching valve 43 is a three-way valve located at the connection portion P3 where the first sub-pressurizing pipe 34 is connected to the first sub-supply pipe 31. The second switching valve 44 is a three-way valve located at the connection portion P4 where the second sub-pressurizing pipe 35 is connected to the second sub-supply pipe 32. The auxiliary tank on-off valve 45 is located at the outlet port of the auxiliary tank 24. Instead of the auxiliary tank on-off valve 45, a check valve that allows the flow from the auxiliary tank 24 through the auxiliary pipe 36 toward the main supply pipe 30 and blocks its opposite flow may be located at an intermediate portion of the auxiliary pipe 36. In other words, the check valve opens a passage of the auxiliary pipe 36 when pressure at the joining connection portion K side is lower than pressure at the auxiliary tank 24 side. On the other hand, the check valve closes the passage of the auxiliary pipe 36 when the pressure of the joining connection portion K is higher than the pressure of the auxiliary tank 24.

By the operation of the first switching valve 43, the valve system 26 can switch between a state where the first fuel tank 21 communicates with the first internal combustion engine channel A1 and a state where the first fuel tank 21 communicates with the first pump channel B1. By the operation of the second switching valve 44, the valve system 26 can switch between a state where the second fuel tank 22 communicates with the second internal combustion engine channel A2 and a state where the second fuel tank 22 communicates with the second pump channel B2. As above, the valve system 26 switches the channels among the first fuel tank 21, the pressurizing pump 23, and the fuel gas pipe 25 and the channels among the second fuel tank 22, the pressurizing pump 23, and the fuel gas pipe 25. In other words, the fuel gas pipe 25 includes: the channel A1 extending from the fuel tank 21 to the internal combustion engine E without through the pressurizing pump 23; the channel A2 extending from the fuel tank 22 to the internal combustion engine E without through the pressurizing pump 23; the channel B1 extending from the fuel tank 21 to the internal combustion engine E through the pressurizing pump 23; and the channel B2 extending from the fuel tank 22 to the internal combustion engine E through the pressurizing pump 23. These channels are switchable by the valve system 26. These channels may partially share a channel.

The first fuel tank pressure sensor 27 detects the pressure of the hydrogen gas stored in the first fuel tank 21. The second fuel tank pressure sensor 28 detects the pressure of the hydrogen gas stored in the second fuel tank 22. The auxiliary tank pressure sensor 29 detects the pressure of the hydrogen gas stored in the auxiliary tank 24.

The pressure reducing valve 47 is located at a portion of the main supply pipe 30 which is located closer to the internal combustion engine E than the joining connection portion K where the auxiliary pipe 36 is connected to the main supply pipe 30, i.e., which is located downstream of the joining connection portion K. The pressurizing pump 23 and the auxiliary tank 24 are located upstream of the pressure reducing valve 47. The pressure reducing valve 47 maintains the pressure of a portion of the main supply pipe 30 which is located downstream of the pressure reducing valve 47, at the predetermined fuel injection pressure of the internal combustion engine E. When the pressure at the downstream side of the pressure reducing valve 47 is lower than the fuel injection pressure, the pressure reducing valve 47 opens a bypass passage through which the upstream and downstream sides of the pressure reducing valve 47 communicate with each other. When the pressure at the downstream side of the pressure reducing valve 47 exceeds the fuel injection pressure, the pressure reducing valve 47 closes the bypass passage. As above, the pressure of the hydrogen gas flowing through the downstream side of the pressure reducing valve 47 is made lower than the pressure of the hydrogen gas flowing through the upstream side of the pressure reducing valve 47 such that the pressure of the hydrogen gas supplied from the main supply pipe 30 to the internal combustion engine E is maintained at the predetermined injection pressure. The shutoff valve 48 is located at a portion, located downstream of the pressure reducing valve 47, of the main supply pipe 30 so as to be able to block the supply of the hydrogen gas from the main supply pipe 30 to the internal combustion engine E in an emergency.

The fuel ECU 50 controls the valve system 26 and the clutch 39 based on detection signals of the sensors 27 to 29. The fuel ECU 50 includes a processor, a system memory, and a storage memory. The processor includes, for example, a central processing unit (CPU). The system memory is, for example, a RAM. The storage memory may include a ROM. The storage memory may include a hard disk, a flash memory, or a combination thereof. The storage memory stores a program. A configuration in which the processor executes the program read out into the system memory is one example of first processing circuitry.

Figure 2:
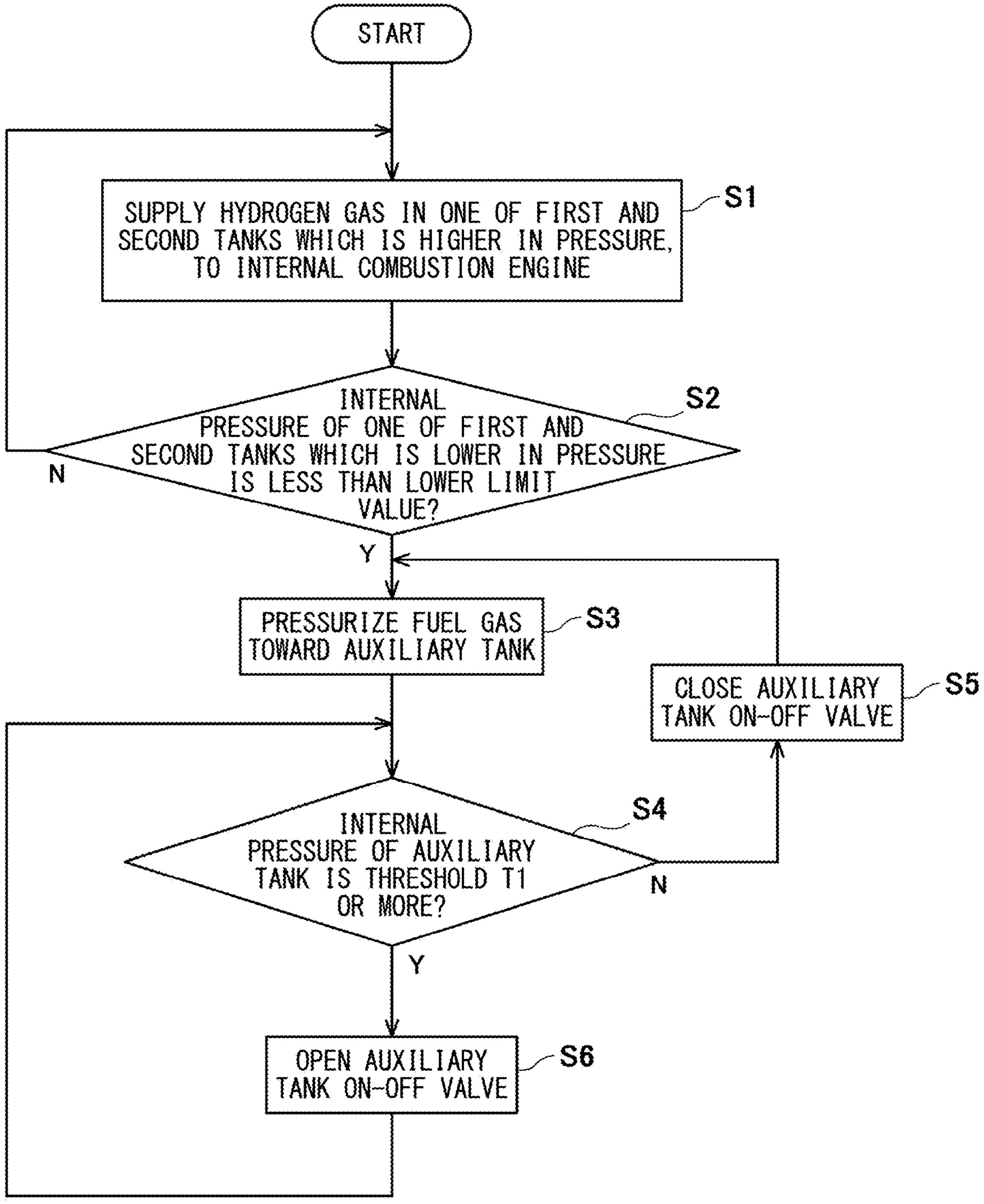
FIG. 2 is a flowchart for explaining the control of the system of FIG. 1.

FIG. 2 is a flowchart for explaining the control of the system of FIG. 1. The following will be described based on the flow of FIG. 2 with reference to the configuration of FIG. 1. The fuel ECU 50 controls the valve system 26 such that the hydrogen gas in the first fuel tank 21 and the hydrogen gas in the second fuel tank 22 decrease unequally. For example, the fuel ECU 50 controls the valve system 26 such that the hydrogen gas in one of the first fuel tank 21 and the second fuel tank 22 is preferentially consumed.

During the operation of the internal combustion engine E, the fuel ECU 50 controls the valve system 26 such that the hydrogen gas flowing through a channel of one of the first sub-supply pipe 31 and the second sub-supply pipe 32 which is higher in pressure is supplied to the internal combustion engine E without through the pressurizing pump 23 (Step S1). Herein, assume that the pressure of the first sub-supply pipe 31 is higher than the pressure of the second sub-supply pipe 32. To be specific, assume that the internal pressure of the first fuel tank 21 is higher than the internal pressure of the second fuel tank 22. In this case, in a state where the first fuel tank on-off valve 41 is in an open state, the fuel ECU 50 controls the first switching valve 43 to open the channel A1 extending from the first sub-supply pipe 31 toward the main supply pipe 30 and close the channel B1 extending from the first sub-supply pipe 31 toward the first sub-pressurizing pipe 34.

Thus, the hydrogen gas in the first fuel tank 21 reaches the pressure reducing valve 47 through the main supply pipe 30. The pressure of the hydrogen gas is reduced by the pressure reducing valve 47 to pressure suitable for the injection to the internal combustion engine E, and the hydrogen gas is supplied to the internal combustion engine E. It is preferable that in Step S1, the fuel ECU 50 close the auxiliary tank on-off valve 45 before opening the on-off valve 41. Thus, the high-pressure hydrogen gas from the fuel tank 21 can be prevented from flowing backward to the auxiliary tank 24 through the joining connection portion K. Moreover, it is preferable that the fuel ECU 50 perform switching control of the on-off valve 43 before opening the on-off valve 41. Thus, the high-pressure gas from the first fuel tank 21 can be prevented from flowing to the main pressurizing pipe 33. Similarly, to prevent the high-pressure hydrogen gas from flowing from the first fuel tank 21 to the second fuel tank 22, the fuel ECU 50 may perform switching control of the second fuel tank on-off valve 44 before opening the on-off valve 41.

The fuel ECU 50 determines based on the detection signals of the first fuel tank pressure sensor 27 and the second fuel tank pressure sensor 28 whether or not the internal pressure of one of the first fuel tank 21 and the second fuel tank 22 which is lower in the internal pressure is less than a predetermined lower limit value L (Step S2). Herein, as described above, assume that the internal pressure of the second fuel tank 22 is lower than the internal pressure of the first fuel tank 21. In this case, the fuel ECU 50 determines based on the detection signal of the second fuel tank pressure sensor 28 whether or not the internal pressure of the second fuel tank 22 is less than the predetermined lower limit value L. For example, the lower limit value L is set to a value equal to the predetermined fuel injection pressure of the internal combustion engine E or a value larger than the fuel injection pressure.

When the internal pressure of the second fuel tank 22 is not less than the lower limit value L (No in Step S2), the fuel ECU 50 returns to Step S1. When each of the internal pressure of the first fuel tank 21 and the internal pressure of the second fuel tank 22 is the lower limit value L or more, the fuel ECU 50 maintains a closed state of the second on-off valve 42 and sets the clutch 39 to a disengaged state. In contrast, when the internal pressure of the second fuel tank 22 is less than the lower limit value L (Yes in Step S2), the fuel ECU 50 controls the valve system 26 and the clutch 39 to pressurize the hydrogen gas of the second fuel tank 22 toward the auxiliary tank 24 (Step S3).

Specifically, in Step S3, the fuel ECU 50 controls the second switching valve 44 to close the channel A2 extending from the second sub-supply pipe 32 toward the main supply pipe 30 and open the channel B2 extending from the second sub-supply pipe 32 toward the second sub-pressurizing pipe 35. In this case, the fuel ECU 50 closes the auxiliary tank on-off valve 45 and sets the clutch 39 to an engaged state. It is preferable that in Step S3, the fuel ECU 50 perform channel switching control of the second fuel tank on-off valve 44 before the opening control of the on-off valve 42. Thus, the high-pressure hydrogen gas from the fuel tank 22 can be prevented from flowing to the main pressurizing pipe 33. The order of Steps S1 and S2 may be reversed. By setting the channels as above, the internal combustion engine operates while using the hydrogen gas of the first fuel tank 21 as the fuel.

In this case, the pressurizing pump 23 driven by the internal combustion engine E pressurizes the hydrogen gas supplied from the second fuel tank 22, and the pressurized hydrogen gas is filled in the auxiliary tank 24. To be specific, when the fuel ECU 50 controls the valve system 26 such that the hydrogen gas in the first fuel tank 21 is supplied to the internal combustion engine E, and the internal combustion engine E is operating, the fuel ECU 50 makes the pressurizing pump 23 pressurize the hydrogen gas supplied from the second fuel tank 22.

The fuel ECU 50 determines based on the detection signal of the auxiliary tank pressure sensor 29 whether or not the internal pressure of the auxiliary tank 24 is a predetermined threshold T1 or more (Step S4). The threshold T1 is set to pressure higher than the predetermined fuel injection pressure of the internal combustion engine E. For example, the threshold T1 is set to a value larger than the lower limit value L of the internal pressure of each of the fuel tanks 21 and 22. For example, the threshold T1 may be set to pressure higher than the internal pressure of the first fuel tank 21 which is detected by the first fuel tank pressure sensor 27. A threshold T2 is set to less than allowable pressure of each of the fuel gas pipe 25 and the auxiliary tank 24. When the internal pressure of the auxiliary tank 24 is less than the threshold T1 (No in Step S4), the fuel ECU 50 maintains a closed state of the auxiliary tank on-off valve 45 and returns to Step S3 (Step S5). To be specific, the hydrogen gas from the second fuel tank 22 is continuously filled in the auxiliary tank 24 while being pressurized by the pressurizing pump 23.

When the internal pressure of the auxiliary tank 24 is the threshold T1 or more (Yes in Step S4), the fuel ECU 50 opens the auxiliary tank on-off valve 45 (Step S6). Thus, the hydrogen gas in the auxiliary tank 24 may be supplied to the main supply pipe 30 through the auxiliary pipe 36. To be specific, the hydrogen gas pressurized by the pressurizing pump 23 may be supplied to the internal combustion engine E. In Step S5, the clutch 39 may be disengaged, and the operation of the pressurizing pump 23 may be stopped.

The fuel ECU 50 may change the threshold T1 in accordance with the internal pressure of one of the first fuel tank 21 and the second fuel tank 22 which is higher in the internal pressure. For example, the fuel ECU 50 may lower the threshold T1 when the internal pressure of one of the first fuel tank 21 and the second fuel tank 22 which is higher in the internal pressure lowers.

Figure 3:
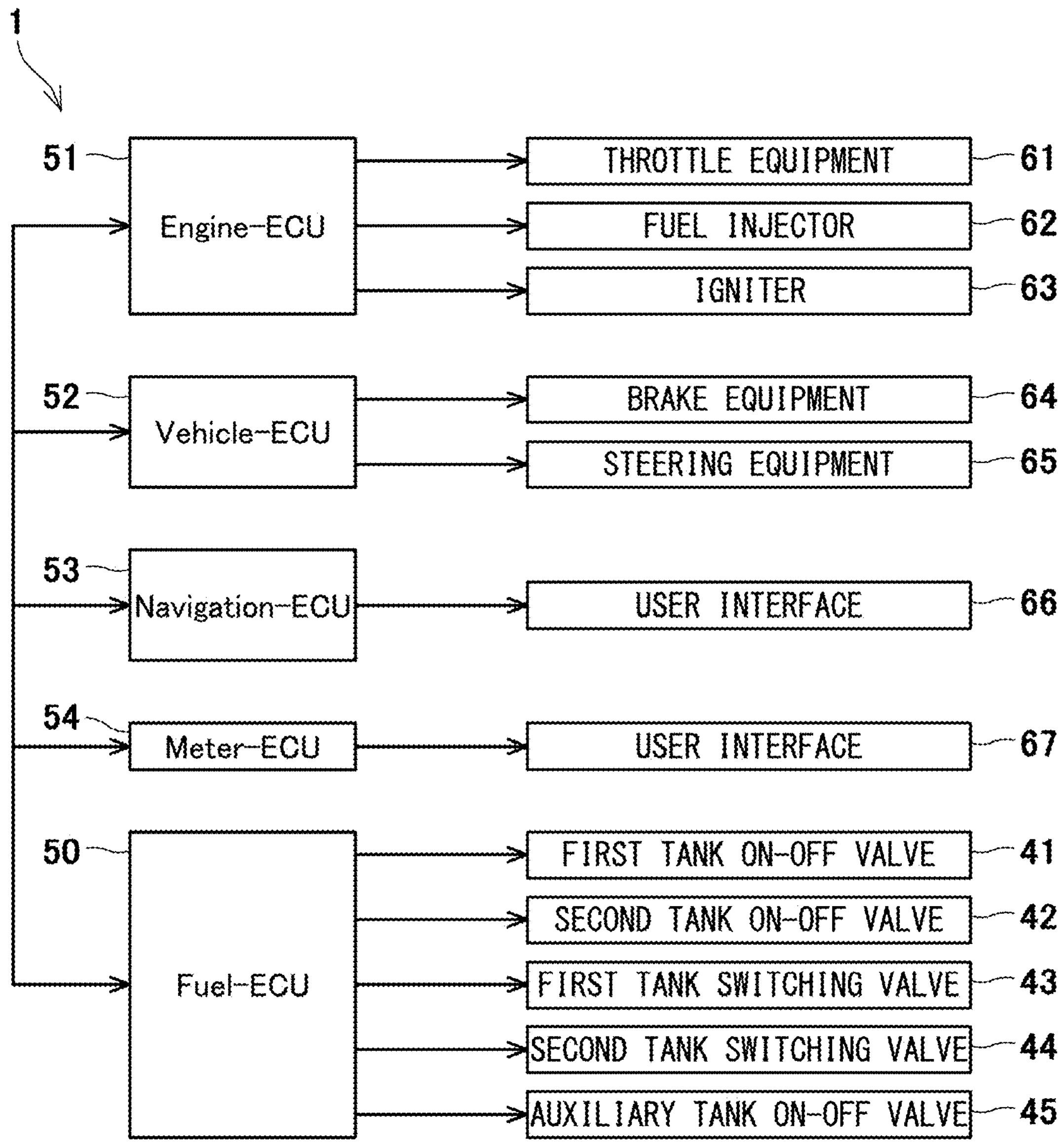
FIG. 3 is a block diagram showing ECUs, etc. of the vehicle of FIG. 1.

FIG. 3 is a block diagram showing ECUs 50 to 54, etc. of the vehicle 1 of FIG. 1. As shown in FIG. 3, the vehicle 1 includes at least one ECU in addition to the fuel ECU 50. The at least one ECU controls equipment different from the valve system 26. The at least one ECU may be, for example, a controller that controls the behavior of the vehicle 1. The at least one ECU may be a controller of the internal combustion engine E. The at least one ECU may be a controller that integrally controls the vehicle 1.

The at least one ECU includes at least one of, for example, an engine ECU 51, a vehicle ECU 52, a navigation ECU 53, and a meter ECU 54. The engine ECU 51 controls throttle equipment 61, a fuel injector 62, and an igniter 63 to control the internal combustion engine E. The vehicle ECU 52 controls brake equipment 64 for ABS or CBS and controls steering equipment 65 for driving support. The navigation ECU 53 communicates with a satellite measurement system and outputs, for example, a guide of a traveling route to a user interface 66. The meter ECU 54 displays on a user interface 67, information (a vehicle speed, an engine rotational frequency, and the like) obtained from the detection signal of a sensor mounted on the vehicle 1. In each of the ECUs 51 to 54, a configuration in which the processor executes the program read out into the system memory is one example of second processing circuitry. The ECUs 50 to 54 are connected to each other so as to be able to perform information communication therebetween.

The engine ECU 51 may change the engine control based on information supplied from the fuel ECU 50. For example, when the fuel ECU 50 determines that both of the internal pressure of the first fuel tank 21 and the internal pressure of the second fuel tank 22 are less than the lower limit value L, the fuel ECU 50 may transmit an output suppression mode command to the engine ECU 51. When the fuel ECU 50 determines based on the detection signals of the first fuel tank pressure sensor 27 and the second fuel tank pressure sensor 28 that the total of the amount of hydrogen gas remaining in the first fuel tank 21 and the amount of hydrogen gas remaining in the second fuel tank 22 is less than a predetermined value, the fuel ECU 50 may transmit an eco mode command, which suppresses the consumption of the hydrogen gas, to the engine ECU 51.

In contrast, the control of the fuel ECU 50 may be changed based on information supplied from the engine ECU 51. For example, when the two fuel tanks 21 and 22 are adequately filled with the hydrogen, and the fuel ECU 50 receives from the engine ECU 51 a signal indicating the traveling in a mode in which the fuel consumption is large, the fuel ECU 50 may control the valve system 26 such that the hydrogen gas is supplied from both of the two fuel tanks 21 and 22 to the internal combustion engine E to compensate for the shortage of the fuel supply due to the lack of the pressure of the hydrogen gas.

The engine ECU 51 and the fuel ECU 50 may receive a remaining travel distance to a destination from the navigation ECU 53 and make a fuel consumption plan based on the remaining travel distance. When the pressurizing pump 23 is pressurizing the hydrogen gas, the engine ECU 51 may reduce the degree of consumption suppression to extend the cruising distance as compared to when the pressurizing pump 23 is not pressurizing the hydrogen gas. Moreover, the meter ECU 54 may display information indicating that the pressurizing pump 23 is pressurizing the hydrogen gas, on the user interface 67 to present the information to a driver.

Embodiment 2

Figure 4:
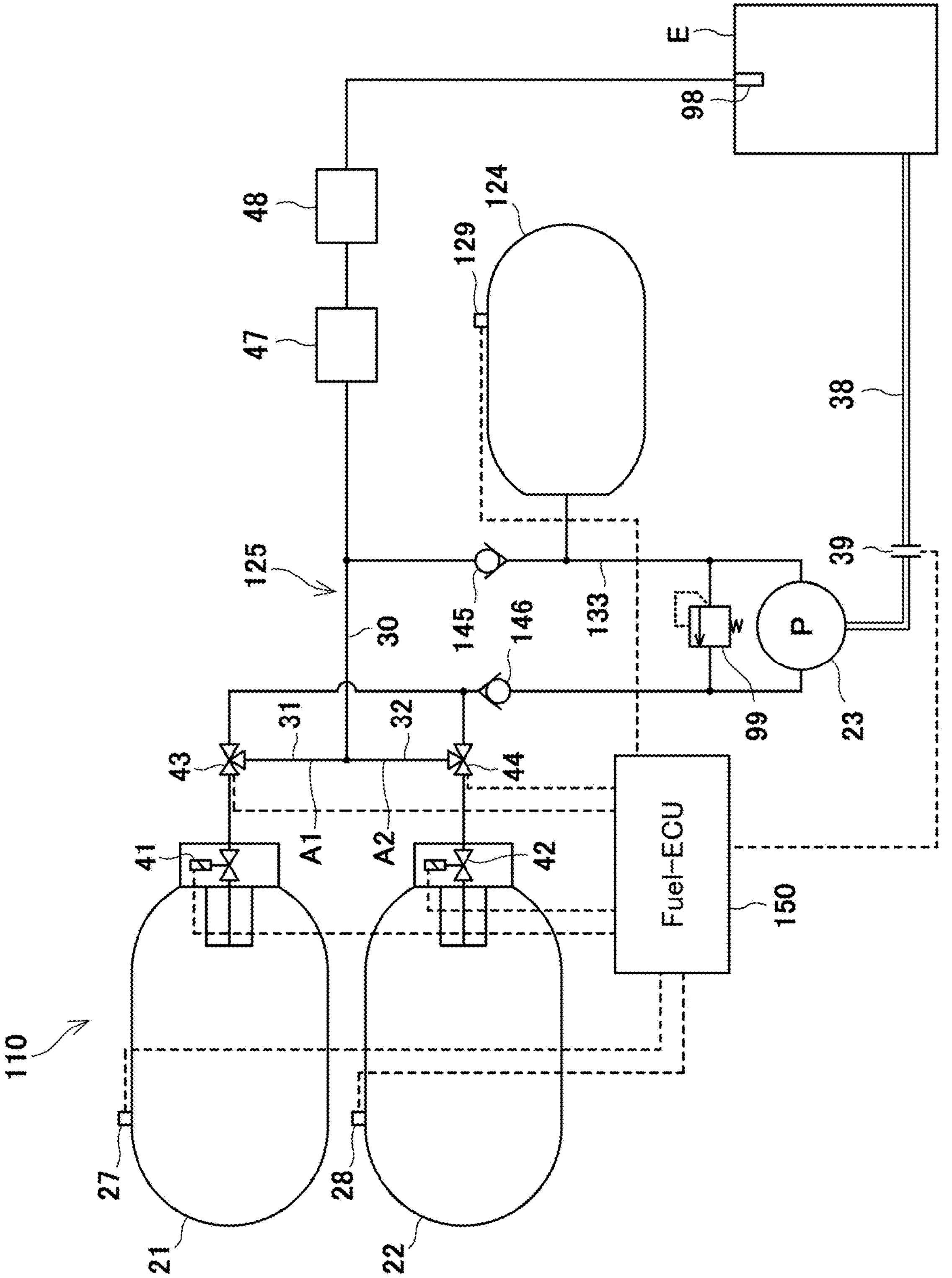
FIG. 4 is a block diagram of the internal combustion engine system according to Embodiment 2.

FIG. 4 is a block diagram of an internal combustion engine system 110 according to Embodiment 2. The same reference signs are used for the same components as Embodiment 1, and explanations thereof are omitted. As shown in FIG. 4, the internal combustion engine system 110 includes an accumulator 124 instead of the auxiliary tank 24 of Embodiment 1. A fuel gas pipe 125 includes a main pressurizing pipe 133 connected to the main supply pipe 30. The accumulator 124 accumulates pressure energy of the hydrogen gas which has been pressurized by the pressurizing pump.

The pressurizing pump 23 is located at the main pressurizing pipe 133. The accumulator 124 is connected to a downstream side of the pressurizing pump 23. To be specific, the accumulator 124 is connected to a portion of the main pressurizing pipe 133 which is located downstream of the pressurizing pump 23. An accumulator pressure sensor 129 that detects the internal pressure of the accumulator 124 is located at the accumulator 124.

A check valve 145 is located at a portion of the main pressurizing pipe 133 which is located downstream of the accumulator 124. The check valve 145 allows the flow from the main pressurizing pipe 133 toward the main supply pipe 30 and blocks its opposite flow. A check valve 146 is located at a portion of the main pressurizing pipe 133 which is located upstream of the pressurizing pump 23. The check valve 146 allows the flow from the first fuel tank on-off valve 41 or the first switching valve 43 toward the pressurizing pump 23 and blocks its opposite flow. The check valve 146 may be omitted.

Figure 5:
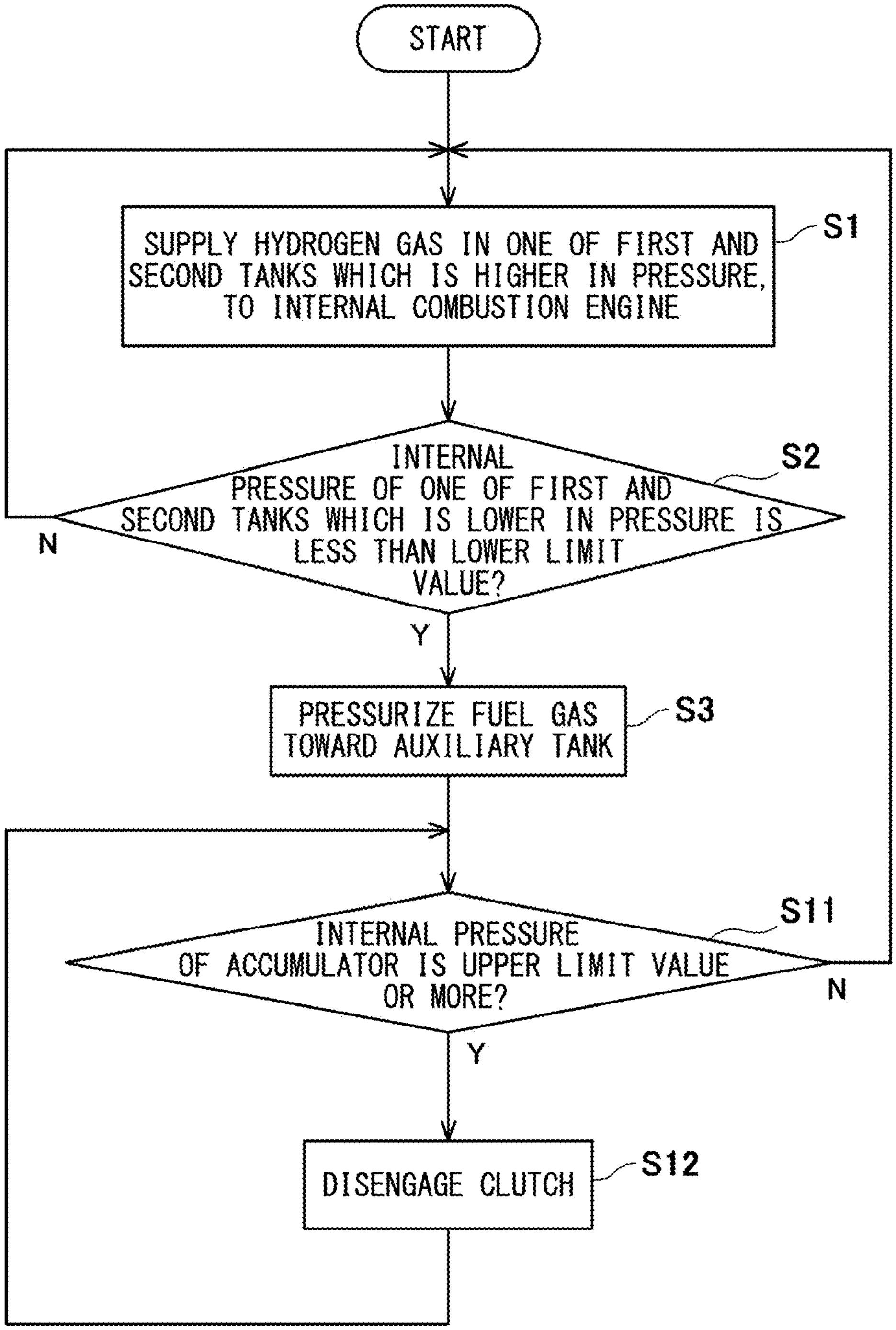
FIG. 5 is a flowchart for explaining the control of the system of FIG. 4.

FIG. 5 is a flowchart for explaining the control of the system of FIG. 4. The following will be described based on the flow of FIG. 5 with reference to the configuration of FIG. 4. Since Steps S1 and S2 of FIG. 5 are the same as Steps S1 and S2 of FIG. 2, explanations thereof are omitted. According to the internal combustion engine system 110, since the auxiliary tank on-off valve 45 is not included, there is no control of the auxiliary tank on-off valve 45. Except for this, Step S3 of FIG. 5 is the same as Step S3 of FIG. 2.

The fuel ECU 150 determines based on the detection signal of the accumulator pressure sensor 129 whether or not the internal pressure of the accumulator 124 is a predetermined upper limit value H or more (Step S11). The upper limit value H is set to a withstand pressure limit of the accumulator 124 or a value close to the withstand pressure limit. When the internal pressure of the accumulator 124 is less than the upper limit value H (No in Step S11), the fuel ECU 150 returns to Step S1. To be specific, the hydrogen gas from the second fuel tank 22 is continuously accumulated in the accumulator 124 by the pressurizing pump 23. When the internal pressure of the accumulator 124 is the upper limit value H or more (Yes in Step S11), the fuel ECU 50 disengages the clutch 39 (Step S12). Since the other components are the same as those of Embodiment 1, explanations thereof are omitted.

Pressure fluctuation of the hydrogen gas at the upstream side of the pressure reducing valve 47 is easily suppressed by using the accumulator 124. Even when the hydrogen gas is rapidly consumed, such as when rapid acceleration is performed, the shortage of the fuel supply due to the lack of the pressure of the hydrogen gas can be easily prevented. Moreover, the fluctuation of the discharge pressure by the pressurizing pump 23 can be suppressed by using the accumulator 124, and therefore, the choices of the pressurizing pump 23 to be selected are easily increased. For example, pressure pulsation generated by the pressurizing pump 23 of a reciprocating type is easily suppressed by using the accumulator 124. Moreover, since the pressure energy is accumulated in the accumulator 124, the amount of required hydrogen pressurization of the pressurizing pump 23 per unit time can be reduced, and therefore, the size of the pressurizing pump 23 is easily reduced.

Embodiment 3

Figure 6:
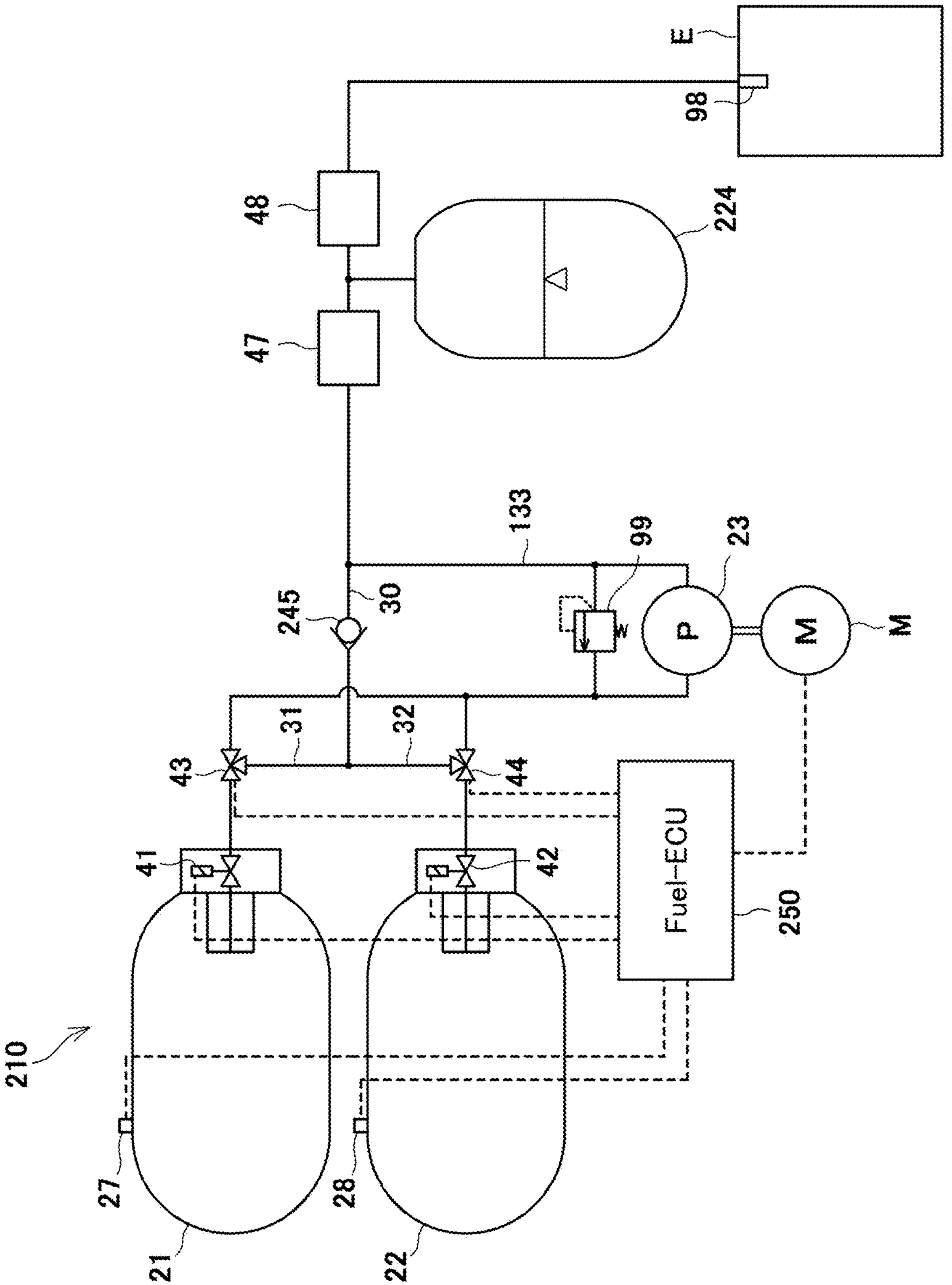
FIG. 6 is a block diagram of the internal combustion engine system according to Embodiment 3.

FIG. 6 is a block diagram of an internal combustion engine system 210 according to Embodiment 3. The same reference signs are used for the same components as Embodiment 1 or 2, and explanations thereof are omitted. As shown in FIG. 6, in the internal combustion engine system 210, the pressurizing pump 23 is driven by an actuator M instead of the internal combustion engine E. The actuator M may be, for example, an electric motor or a hydraulic motor.

A check valve 245 is located at a portion of the main supply pipe 30 which is located upstream of a connection portion where the main pressurizing pipe 133 is connected to the main supply pipe 30. The check valve 245 allows the flow from the first sub-supply pipe 31 and the second sub-supply pipe 32 toward the pressure reducing valve 47 and blocks its opposite flow. The check valve 245 may be omitted. An accumulator 224 is connected to a portion of the main supply pipe 30 which is located downstream of the pressure reducing valve 47. Thus, pulsation of a channel between the pressure reducing valve 47 and the internal combustion engine E is suppressed. The accumulator 124 may be located between the check valve 245 and the pressure reducing valve 47.

When a fuel ECU 250 determines that the internal pressure of the second fuel tank 22 is less than the lower limit value L, the fuel ECU 250 drives the actuator M to make the pressurizing pump 23 pressurize the hydrogen gas supplied from the second fuel tank 22. When the internal pressure of the first fuel tank 21 is adequate, the fuel ECU 250 may stop the actuator M. Since the other components are the same as those of Embodiment 1 or 2, explanations thereof are omitted.

In the present embodiment, the pressurizing pump 23 can be driven irrespective of the driving of the internal combustion engine E. Therefore, for example, while the driving of the internal combustion engine E is in a stop state, the hydrogen can be pressurized. In contrast, when the pressure of the hydrogen gas is adequately high, the pressurization is unnecessary, and therefore, the driving of the pressurizing pump 23 can be stopped. Moreover, even when the pressure at the upstream side of the pressure reducing valve 47 increases or decreases, influence on the downstream side can be suppressed by the accumulator 224.

Embodiment 4

Figure 7:
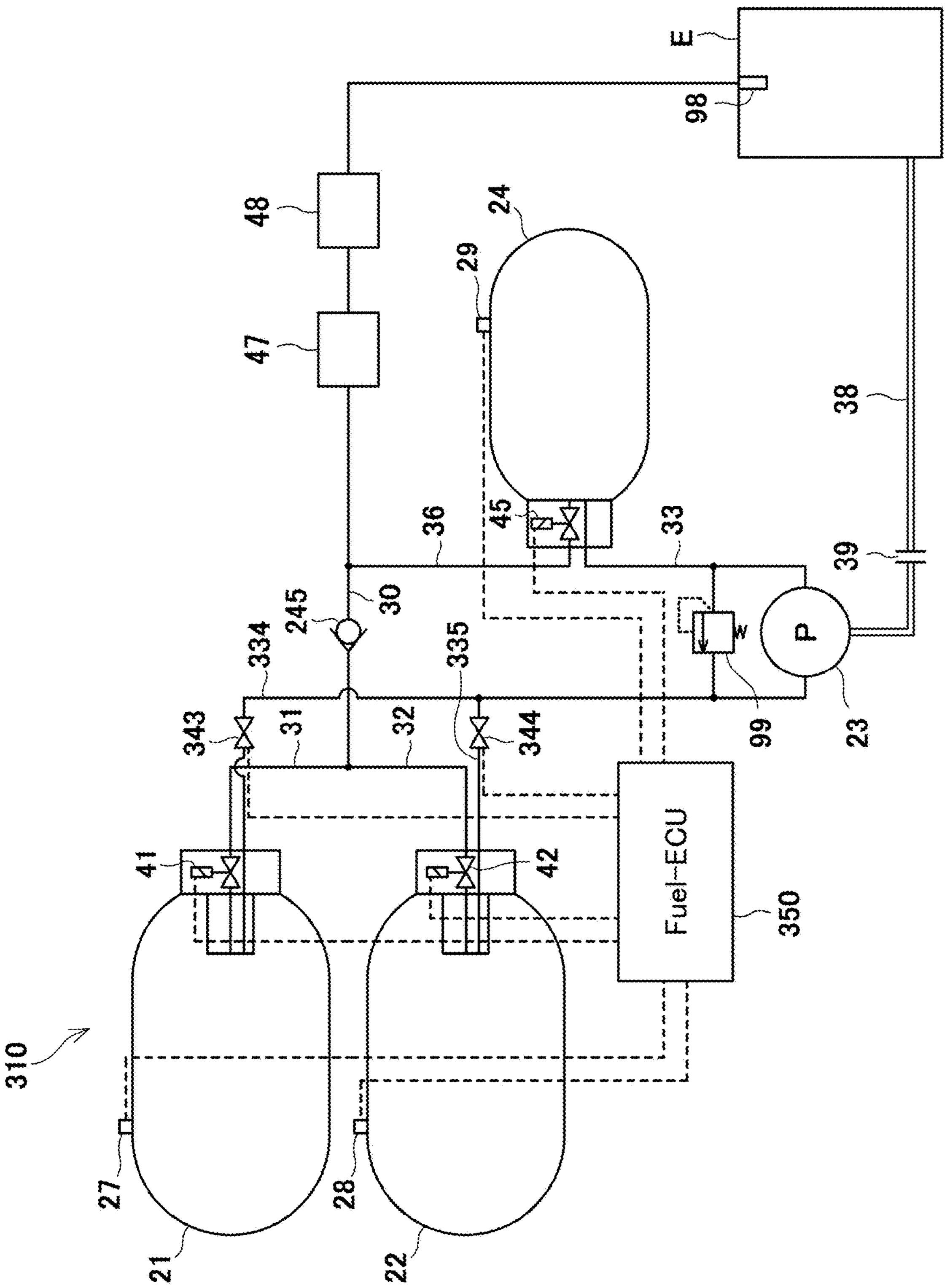
FIG. 7 is a block diagram of the internal combustion engine system according to Embodiment 4.

FIG. 7 is a block diagram of an internal combustion engine system 310 according to Embodiment 4. The same reference signs are used for the same components as any one of Embodiments 1 to 3, and explanations thereof are omitted. As shown in FIG. 7, in the internal combustion engine system 310, a first sub-pressurizing pipe 334 is located independently from the first sub-supply pipe 31, and a second sub-pressurizing pipe 335 is located independently from the second sub-supply pipe 32.

A first on-off valve 343 is located at the first sub-pressurizing pipe 334, and a second on-off valve 344 is located at the second sub-pressurizing pipe 335. The check valve 245 that allows the flow from the first fuel tank 21 and the second fuel tank 22 toward the pressure reducing valve 47 and blocks its opposite flow is located at the main supply pipe 30. The check valve 245 may be omitted.

When a fuel ECU 350 determines that the internal pressure of the second fuel tank 22 which is lower between the internal pressure of the first fuel tank 21 and the internal pressure of the second fuel tank 22 is less than the lower limit value L, the fuel ECU 350 closes the second fuel tank on-off valve 42 and opens the second on-off valve 344. In this case, the fuel ECU 350 closes the auxiliary tank on-off valve 45 and sets the clutch 39 to an engaged state. As above, the pressurizing pump 23 driven by the internal combustion engine E pressurizes the hydrogen gas supplied from the second fuel tank 22, and the pressurized hydrogen gas is filled in the auxiliary tank 24. Since the other components are the same as those of any one of Embodiments 1 to 3, explanations thereof are omitted. In the present embodiment, a desired channel can be formed without using a three-way valve.

Embodiment 5

Figure 8:
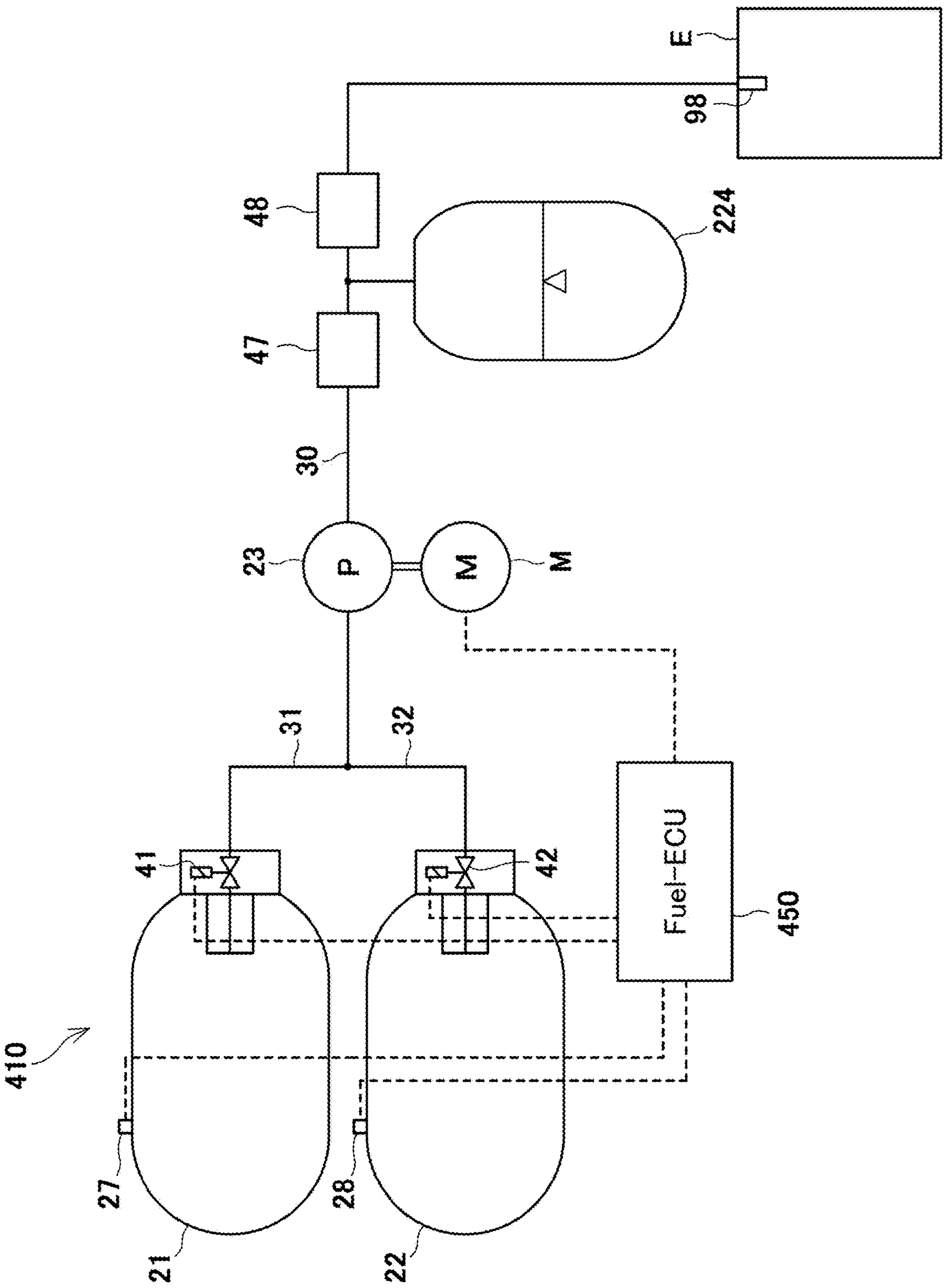
FIG. 8 is a block diagram of the internal combustion engine system according to Embodiment 5.

FIG. 8 is a block diagram of an internal combustion engine system 410 according to Embodiment 5. The same reference signs are used for the same components as any one of Embodiments 1 to 4, and explanations thereof are omitted. As shown in FIG. 8, in the internal combustion engine system 410, the pressurizing pump 23 is located at the main supply pipe 30.

When a fuel ECU 450 determines that each of the internal pressure of the first fuel tank 21 and the internal pressure of the second fuel tank 22 is higher than the lower limit value L, the fuel ECU 450 does not drive the actuator M, makes the pressurizing pump 23 idle, and makes the hydrogen gas in the main supply pipe 30 flow through the pressurizing pump 23.

When the fuel ECU 450 determines that the internal pressure of the second fuel tank 22 which is lower between the internal pressure of the first fuel tank 21 and the internal pressure of the second fuel tank 22 is less than the lower limit value L, the fuel ECU 450 closes the first fuel tank on-off valve 41, opens the second fuel tank on-off valve 42, and drives the actuator M to pressurize the hydrogen gas, flowing through the main supply pipe 30, by the pressurizing pump 23.

When the fuel ECU 450 determines that the pressure of the hydrogen gas flowing through the main supply pipe 30 is lower than the lower limit value L in a state where both of the first fuel tank on-off valve 41 and the second fuel tank on-off valve 42 are in an open state, the fuel ECU 450 may drive the actuator M to pressurize the hydrogen gas, flowing through the main supply pipe 30, by the pressurizing pump 23. The pressure of the hydrogen gas flowing through the main supply pipe 30 may be detected by a pressure sensor located at the main supply pipe 30 or may be estimated from the pressure of the first fuel tank 21, the pressure of the second fuel tank 22, the opening degree of the first fuel tank on-off valve 41, and the opening degree of the second fuel tank on-off valve 42. Since the other components are the same as those of any one of Embodiments 1 to 4, explanations thereof are omitted.

Embodiment 6

Figure 9:
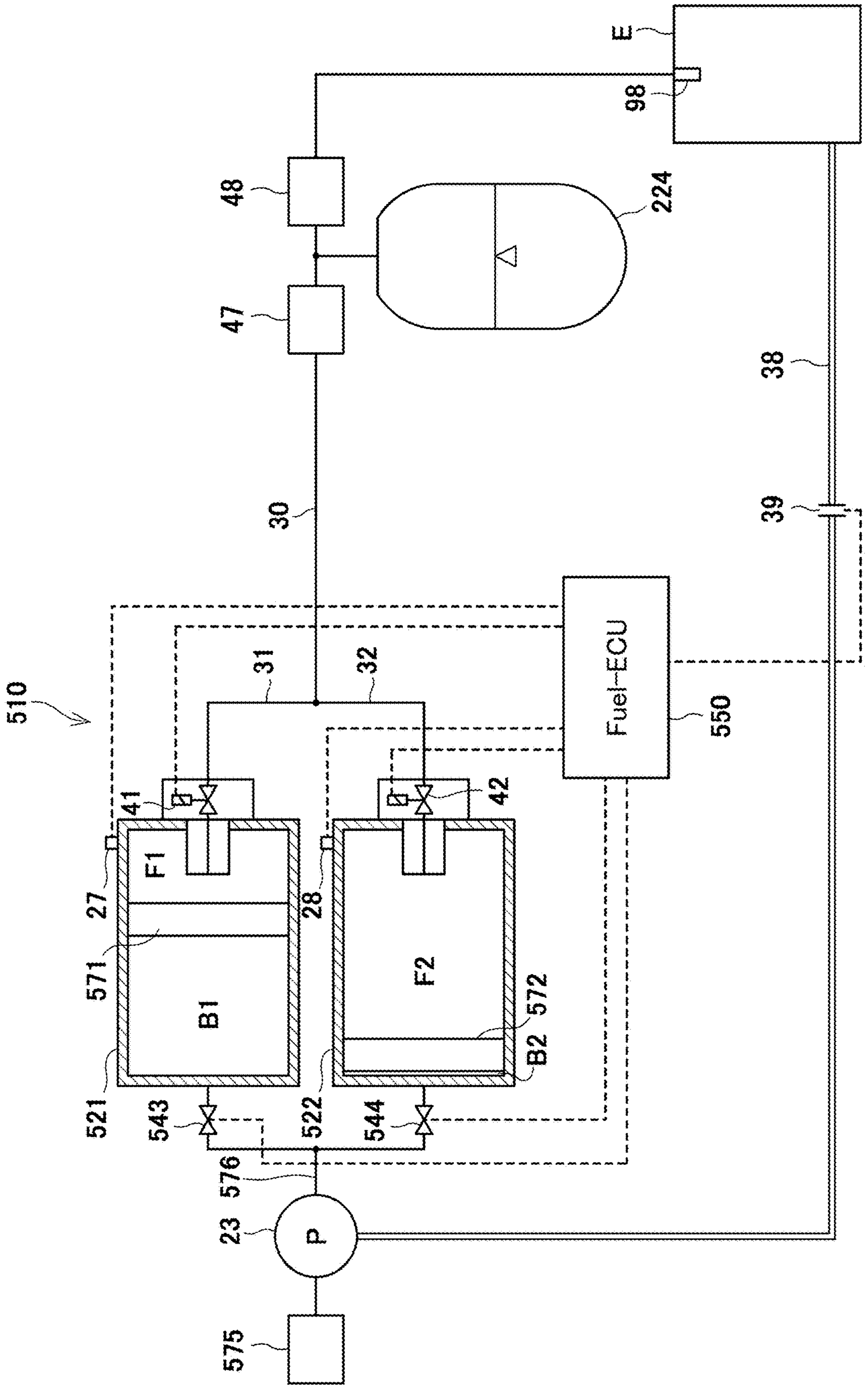
FIG. 9 is a block diagram of the internal combustion engine system according to Embodiment 6.

FIG. 9 is a block diagram of an internal combustion engine system 510 according to Embodiment 6. The same reference signs are used for the same components as any one of Embodiments 1 to 5, and explanations thereof are omitted. As shown in FIG. 9, in the internal combustion engine system 510, the volume of a hydrogen gas storing space of a first fuel tank 521 and the volume of a hydrogen gas storing space of a second fuel tank 522 are changeable. For example, the first fuel tank 521 includes a piston 571, and the second fuel tank 522 includes a piston 572.

The piston 571 of the first fuel tank 521 divides an internal space of the first fuel tank 521 into a hydrogen gas chamber F1 and a back pressure chamber G1. The piston 572 of the second fuel tank 522 divides an internal space of the second fuel tank 522 into a hydrogen gas chamber F2 and a back pressure chamber G2. The back pressure chamber G1 and the back pressure chamber G2 are connected to a fluid supply source 575 through a fluid pipe 576. To be specific, the volume of the hydrogen gas chamber F1 is changed by the displacement of the piston 571, and the volume of the hydrogen gas chamber F2 is changed by the displacement of the piston 572.

The pressurizing pump 23 is located at the fluid pipe 576. The fluid pipe 576 branches toward the back pressure chamber G1 and the back pressure chamber G2 at the downstream side of the pressurizing pump 23. A first on-off valve 543 is located at a branch portion of the fluid pipe 576 which extends toward the back pressure chamber G1. A second on-off valve 544 is located at a branch portion of the fluid pipe 576 which extends toward the back pressure chamber G2.

When a fuel ECU 550 determines based on the detection signal of the first fuel tank pressure sensor 27 that the pressure of the hydrogen gas chamber F1 of the first fuel tank 521 is less than the lower limit value L, the fuel ECU 550 sets the clutch 39 to the engaged state and opens the first on-off valve 543. Thus, the fluid pressurized by the pressurizing pump 23 flows into the back pressure chamber G1, and this moves the piston 571. Thus, the pressure in the hydrogen gas chamber F1 is increased. The same is true for the second fuel tank 522. Since the other components are the same as those of any one of Embodiments 1 to 5, explanations thereof are omitted.

Embodiment 7

Figure 10:
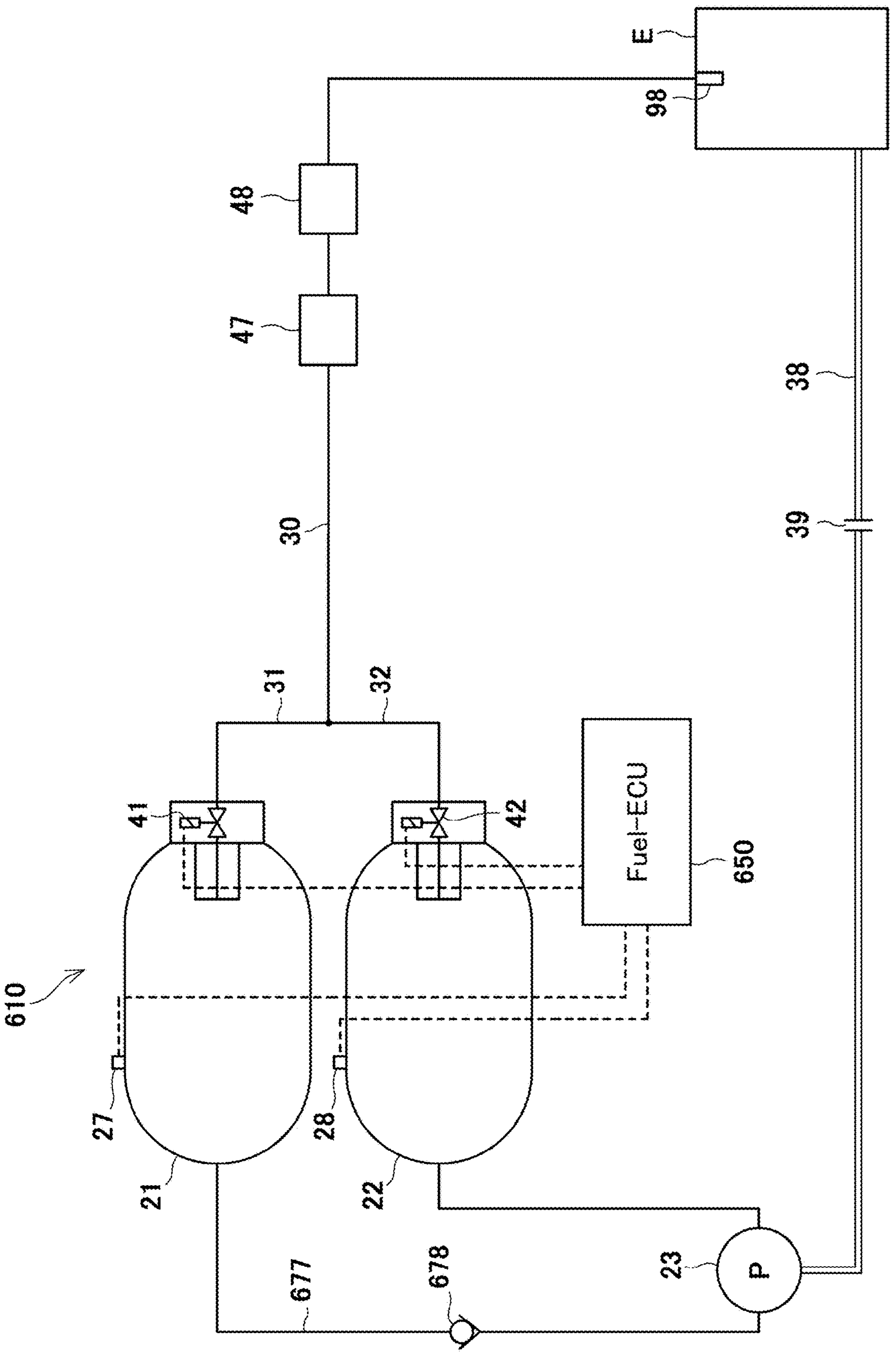
FIG. 10 is a block diagram of the internal combustion engine system according to Embodiment 7.

FIG. 10 is a block diagram of an internal combustion engine system 610 according to Embodiment 7. The same reference signs are used for the same components as Embodiment 1, and explanations thereof are omitted. As shown in FIG. 10, the first fuel tank 21 and the second fuel tank 22 are connected to each other through a communication pipe 677.

When a fuel ECU 650 determines based on the detection signal of the second fuel tank pressure sensor 28 that the internal pressure of the second fuel tank 22 is less than the lower limit value L, the fuel ECU 650 sets the clutch 39 to the engaged state. Thus, the hydrogen gas having flowed out from the second fuel tank 22 to the communication pipe 677 is pressurized, and the pressurized hydrogen gas is supplied to the first fuel tank 21. Since the other components are the same as those of any one of Embodiments 1 to 6, explanations thereof are omitted.

The technology of the present disclosure is not limited to the above embodiments. The internal combustion engine E may be a direct injection engine in which the fuel gas is injected into a cylinder, but may be a port injection engine in which the fuel gas is injected into an intake port. The internal combustion engine E may be a supercharged engine in which air is compressed by a supercharger and supplied into a cylinder. When the internal combustion engine E is a supercharged direct injection engine, the internal combustion engine E needs to be supplied with the hydrogen gas having injection pressure further higher than that of a non-supercharged engine.

For example, instead of the internal combustion engine E, the hydrogen gas consuming source may be a fuel cell that generates electric power by a chemical reaction between a fuel gas and oxygen through a catalyst. Instead of the hydrogen gas, another type of fuel gas that is combustible may be used. The fuel gas may be a hydrocarbon fuel gas, specifically, a methane gas, a propane gas, or an ammonia gas. From the viewpoint of the suppression of carbon dioxide by combustion, it is preferable to use the hydrogen gas as the fuel gas for the internal combustion engine E.

The internal combustion engine system may include only one fuel tank or may include three or more fuel tanks instead of two fuel tanks. When the tanks are the same in structure as each other, the types of parts can be reduced. Moreover, the tanks may be different in structure from each other. For example, two types of tanks including a tank having a structure suitable for pressurization and a tank having a structure suitable for storage may be used.

Fluid circuits described in the embodiments can be suitably changed. For example, an embodiment in which an auxiliary tank and an accumulator are not included may be adopted. As described above, the pressurizing pump 23 may be driven by using the energy generated by the internal combustion engine E. Moreover, the pressurizing pump 23 may be driven by power of a driving source different from the internal combustion engine E. For example, an embodiment in which the pressurizing pump 23 is driven by an electric motor different from the internal combustion engine E may be adopted.

Regardless of the configurations of the embodiments, to set the pressure of the pressurized hydrogen gas to a predetermined value or less, both of the relief valve 99 and the clutch 39 may be included, or only one of the relief valve 99 and the clutch 39 may be included. The first fuel tank on-off valve 41, the second fuel tank on-off valve 42, and the auxiliary tank on-off valve 45 are respectively located at the outlet ports of the tanks 21, 22, and 24. However, instead of the outlet ports, the first fuel tank on-off valve 41, the second fuel tank on-off valve 42, and the auxiliary tank on-off valve 45 may be located at channels located downstream of the outlet ports of the tanks. For example, the fuel tank on-off valve 41 may be located between the outlet port of the tank 21 and the switching valve 43, and the fuel tank on-off valve 42 may be located between the outlet port of the tank 22 and the switching valve 44. The auxiliary tank on-off valve 45 may be located between the outlet port of the auxiliary tank 24 and the joining connection position K.

Instead of each of the switching valves 43 and 44, two on-off valves that achieve the same function as the switching valve 43 or 44 may be used. In addition to the auxiliary tank on-off valve 45 located at the outlet port, an on-off valve may be located at the inlet port. Thus, a passage of the inlet port can be closed in a state where the pressure of the hydrogen gas in the auxiliary tank 24 is high. Therefore, the backward flow of the hydrogen gas from the auxiliary tank 24 can be prevented by closing both of the inlet port and outlet port of the auxiliary tank 24. Moreover, to prevent the backward flow, a check valve that prevents the backward flow may be included instead of the auxiliary tank on-off valve 45. In this case, the check valve can be located between the pressurizing pump 23 and the auxiliary tank 24, between the auxiliary tank 24 and the joining connection portion K, between the first connection portion P1 and the joining connection portion K, or the like.

These channels may or may not partially share a channel. Even when the pressure of the hydrogen gas in the fuel tank 21 or 22 is not less than the lower limit value, the hydrogen gas may be pressurized by the pressurizing pump. The pressurizing pump 23 may be driven by using energy obtained by converting the mechanical energy generated by the internal combustion engine E instead of by using the mechanical energy generated by the internal combustion engine E. For example, the energy that drives the actuator M may be electric energy or hydraulic energy obtained by converting the mechanical energy generated by the internal combustion engine E. To be specific, a motor that is driven by the electric energy generated by the internal combustion engine E may be used as a driving source for the pressurizing pump 23. Moreover, the pressurizing pump 23 may be a fluid pump that is driven by fluid energy generated by the internal combustion engine E. The internal combustion engine E and the actuator M are described as the driving source for the pressurizing pump 23. However, in the above embodiments, the internal combustion engine E and the actuator M can be replaced with each other. Each of the above internal combustion engine systems is not limited to a system mounted on a vehicle and may be a stationary internal combustion engine system located in a factory or the like.

The clutch 39 is included. Therefore, when pressurization is unnecessary, the clutch 39 can be controlled to block the transmission of the rotational power to the pressurizing pump 23. Thus, energy loss by the driving of the pressurizing pump 23 when pressurization is unnecessary can be suppressed. Since the power is transmitted by the power transmitting structure 38, the pressurizing pump 23 and the internal combustion engine E can be located away from each other. Thus, the pressurizing pump 23 can be located at such a position as to be hardly influenced by heat generated by the combustion of the internal combustion engine E. Moreover, the degree of freedom of the position of the pressurizing pump 23 can be improved.

In contrast, the power of the rotary member may be directly supplied to the pressurizing pump 23 without using the power transmitting structure 38. According to this, the number of parts can be reduced, and the energy loss regarding the power transmission can be reduced. In addition, the pressurizing pump 23 and the internal combustion engine E can be integrated with each other. For example, an input shaft of the pressurizing pump 23 may be directly connected to the crank shaft of the internal combustion engine E. When the pressurizing pump 23 is driven as above, the structure can be made simpler than when a power converting structure is included between the internal combustion engine E and the pressurizing pump 23. Moreover, a cam that drives the pressurizing pump 23 may be located at the camshaft that drives an intake-exhaust valve of the internal combustion engine E. As above, a converting structure which is included in the internal combustion engine E and converts the rotational movement into the reciprocating movement may be utilized.

When the hydrogen gas which has been pressurized by the pressurizing pump 23 is directly supplied to the internal combustion engine E, and the auxiliary tank 24 and the accumulator 124 are included, the pressure pulsation due to the pressurization by the pressurizing pump 23 can be reduced, and the hydrogen gas whose pressure fluctuation is suppressed can be supplied to the internal combustion engine E. Since the auxiliary tank 24 is made smaller than each of the fuel tanks 21 and 22, the auxiliary tank 24 is easily located at a position close to the pressurizing pump 23. The auxiliary tank 24 may have such a size as to be able to temporarily store the hydrogen gas. Since the auxiliary tank 24 is made smaller than each of the fuel tanks 21 and 22, the internal combustion engine system can be prevented from increasing in size as a whole. The auxiliary tank 24 may include a connection interface structure by which the auxiliary tank 24 is attachable to and detachable from the fuel gas pipe 25 and can be replaced with the fuel tank 21 or 22. Thus, the auxiliary tank 24 filled with the pressurized hydrogen gas can be replaced with the fuel tank 21 or 22. Moreover, the auxiliary tank 24 may have the same shape as each of the fuel tanks 21 and 22. Thus, the number of parts in the valve system 26 can be reduced.

According to the above configuration, by pressurizing the low-pressure fuel gas, the low-pressure hydrogen gas can be effectively utilized, and the hydrogen gas consuming source can operate for a long period of time. For example, while the high-pressure hydrogen gas is being supplied to the hydrogen gas consuming source, the low-pressure hydrogen gas is pressurized. Thus, even in a period in which the pressurization is being performed, the hydrogen gas can be supplied to the consuming source. Thus, supply delay due to the pressurization is easily prevented, and a period in which fuel supply can be continuously performed is easily extended.

The foregoing has described the embodiments as examples of the technology disclosed in the present application. However, the technology in the present disclosure is not limited to this and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The functionality of the control elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The following aspects disclose preferred embodiments.

First Aspect

An internal combustion engine system including:

an internal combustion engine;

at least one fuel tank that stores a fuel gas in a compressed state;

a fuel gas pipe that connects the fuel tank to the internal combustion engine; and a pressurizing pump that pressurizes the fuel gas in the fuel tank and in the fuel gas pipe.

According to this configuration, even when the pressure of the fuel gas in the fuel tank lowers, the fuel gas can be compressed by the pressurizing pump. Therefore, the fuel gas which remains when the internal pressure of the fuel tank has lowered can be supplied to the internal combustion engine. Thus, the amount of fuel gas supplied can be increased. As above, the amount of fuel gas consumed by the combustion in the internal combustion engine in the amount of fuel gas stored in the fuel tank can be increased. Therefore, for example, an operation period of the internal combustion engine can be increased, and the frequency of the supply of the fuel gas can be reduced. Thus, the convenience can be improved. The present embodiment can be suitably used for direct injection engines and supercharged engines in which the fuel injection pressure is high.

Second Aspect

The internal combustion engine system according to the first aspect, further including a pressure reducing valve that is located at the fuel gas pipe and reduces pressure of the fuel gas to a predetermined value or less, wherein the pressurizing pump pressurizes the fuel gas located upstream of the pressure reducing valve.

According to this configuration, since the fuel gas which has flowed through the pressure reducing valve is supplied to the internal combustion engine, the fuel gas having the pressure suitable for the combustion can be supplied to the internal combustion engine. Moreover, the pressurizing pump pressurizes the fuel gas located upstream of the pressure reducing valve, and the pressure reducing valve performs pressure adjustment of the fuel gas. The pressurizing pump may pressurize the fuel gas such that the pressure of the fuel gas exceeds the predetermined value. Therefore, fine pressure adjustment is unnecessary. Thus, the control of the pressurizing pump can be made simple.

Third Aspect

The internal combustion engine system according to the first or second aspect, wherein the pressurizing pump is driven by utilizing energy generated by the internal combustion engine.

According to this configuration, the energy generated by the internal combustion engine is utilized for the driving of the pressurizing pump. Therefore, the system can be simplified. For example, the number of parts in the system can be made smaller than when a driving source that drives the pressurizing pump is additionally included.

Fourth Aspect

The internal combustion engine system according to the third aspect, wherein the pressurizing pump is mechanically driven by the internal combustion engine.

According to this configuration, the energy efficiency can be improved by the simple configuration. Specifically, the pressurizing pump is driven by the mechanical energy directly output by the internal combustion engine. Therefore, as compared to when the pressurizing pump is driven by electric energy or fluid energy obtained by converting the mechanical energy output by the internal combustion engine, there is no energy loss at the time of energy conversion, and this can improve the efficiency. In addition, a converter is not required. Moreover, for example, when rotational power is directly input to the pressurizing pump from a rotary part that is rotated in accordance with the driving of the internal combustion engine, a further simple configuration can be realized.

Fifth Aspect

The internal combustion engine system according to any one of the first to fourth aspects, further including an accumulator connected to the fuel gas pipe.

According to this configuration, the pressurizing pump can be prevented from increasing in size. Specifically, the fuel gas which has been pressurized by the pressurizing pump can be accumulated in the accumulator. Therefore, when the fuel gas is consumed by the internal combustion engine, the fuel gas accumulated in the accumulator is discharged, and this can reduce the burden of the pressurizing pump. Since the required ability of the pressurizing pump can be lowered as above, the pressurizing pump can be prevented from increasing in size.

Sixth Aspect

The internal combustion engine system according to any one of the first to fifth aspects, wherein the fuel gas pipe includes an internal combustion engine channel extending from the fuel tank toward the internal combustion engine and a pump channel extending from the fuel tank to the pressurizing pump, the internal combustion engine system further including:

a valve system that is operatable in a state where the fuel tank communicates with the internal combustion engine channel or a state where the fuel tank communicates with the pump channel; and processing circuitry configured to control the valve system.

According to this configuration, a state where the fuel gas in the fuel tank is supplied to the internal combustion engine and a state where the fuel gas in the fuel tank is supplied to the pressurizing pump can be switched. Therefore, the supply and pressurization of the fuel gas can be performed in accordance with situations. For example, when the pressure of the fuel gas in the fuel tank is adequately high, the fuel gas can be supplied to the internal combustion engine by using the internal combustion engine channel without using the pressurizing pump. Moreover, by pressurizing the fuel gas of the pump channel by using the pressurizing pump, the fuel gas having the pressure suitable for the supply to the internal combustion engine can be provided.

Seventh Aspect

The internal combustion engine system according to the sixth aspect, wherein:

the at least one fuel tank includes a first fuel tank and a second fuel tank;

the processing circuitry determines which of internal pressure of the first fuel tank and internal pressure of the second fuel tank is lower; and the processing circuitry controls the valve system such that the fuel gas supplied from one of the first fuel tank and the second fuel tank which is lower in the internal pressure is guided to the pressurizing pump.

According to this configuration, by pressurizing the fuel gas in the low-pressure fuel tank, the fuel gas can be effectively utilized as the fuel of the internal combustion engine. For example, the fuel gas may be supplied to the internal combustion engine by using the fuel tank which is high in the internal pressure, and at the same time, the pressure of the combustion gas in the fuel tank which is low in the internal pressure may be increased. Therefore, the fuel can be supplied to the internal combustion engine E even while the fuel gas having the low internal pressure is being pressurized to pressure suitable for the supply. Thus, the supply delay due to the pressurization is easily prevented, and a period in which the fuel supply can be continuously performed is easily extended. Moreover, since the fuel gas can be supplied from the fuel tanks to one pressurizing pump, the number of parts can be reduced as compared to when pressurizing pumps are included for the respective fuel tanks.

Eighth Aspect

The internal combustion engine system according to the sixth or seventh aspect, wherein:

the processing circuitry determines whether or not internal pressure of the fuel tank is less than a predetermined lower limit value;

the processing circuitry controls the valve system such that the fuel gas of the fuel tank having the internal pressure that is less than the predetermined lower limit value is guided to the pressurizing pump.

According to this configuration, the fuel gas having high internal pressure is prevented from being pressurized by the pressurizing pump, and therefore, the operating efficiency of the pressurizing pump can be improved. The fuel gas in the fuel tank can be efficiently utilized for the combustion in the internal combustion engine.

Ninth Aspect

The internal combustion engine system according to any one of the first to eighth aspects, wherein the fuel gas includes a hydrogen gas.

According to this configuration, as a fuel amount required to obtain the same output of the internal combustion engine, the amount of hydrogen gas is larger than the amount of carbon fuel. In other words, the consumption amount of hydrogen gas per unit utilization time in the tank is larger than that of carbon fuel per unit utilization time in the tank. According to the above system, the amount of fuel in the fuel tank which can be effectively supplied to the internal combustion engine can be increased. Therefore, the effect of the effective utilization of the hydrogen gas whose consumption amount tends to be relatively large can be made significant.

Tenth Aspect

A vehicle including the internal combustion engine system according to any one of the first to ninth aspects, wherein the vehicle moves by driving power generated by the internal combustion engine system.

According to this configuration, the movable distance of the vehicle can be increased. Specifically, in a period from when the fuel gas is compressed and filled in the fuel tank until when the fuel gas is refilled in the fuel tank, the amount of fuel gas in the fuel tank which can be supplied to the internal combustion engine can be increased. Thus, the cruising distance of the vehicle can be increased in accordance with the increase in the amount of fuel gas supplied to the internal combustion engine. For example, when there are not so many facilities that can refill the fuel tank with the fuel gas, this effect can be further significant.

Eleventh Aspect

The vehicle according to the tenth aspect, wherein:

the internal combustion engine system further includes a valve system that switches channels among the fuel tank, the pressurizing pump, and the fuel gas pipe and first processing circuitry configured to control the valve system;

the vehicle further includes second processing circuitry configured to control equipment different from the valve system; and the first processing circuitry and the second processing circuitry are connected to each other so as to perform information communication therebetween.

According to this configuration, the processing of one of the first processing circuitry and the second processing circuitry can be changed based on information of the other of the first processing circuitry and the second processing circuitry. Therefore, advanced control of the vehicle can be realized. For example, by controlling the channels of the valve system based on information related to the different equipment, the pressure control of the fuel gas which corresponds to the status of the different equipment can be performed. Therefore, for example, the timing of the pressurization of the fuel gas and the amount of pressurization of the fuel gas are easily made appropriate. Moreover, by controlling the different equipment based on information related to the valve system, the behavior control of the vehicle can be performed in accordance with the valve system. Therefore, for example, the behavior of the vehicle is easily made appropriate in accordance with the pressure state of the fuel gas.

Twelfth Aspect

A method of supplying a hydrogen gas, the method including:

supplying to a hydrogen gas consuming source the hydrogen gas of one of two channels which is higher in pressure;

pressurizing by a pressurizing pump the hydrogen gas of one of the two channels which is lower in pressure; and supplying the pressurized hydrogen gas to the hydrogen gas consuming source.

Thirteenth Aspect

A fuel supply apparatus including:

a fuel gas pipe that connects a fuel tank to an internal combustion engine; and a pressurizing pump that pressurizes the fuel gas in the fuel tank or in the fuel gas pipe.

Fourteenth Aspect

A fuel supply circuit system including:

a first channel that connects a fuel tank to a suction port of a pressurizing pump and connects a discharge port of the pressurizing pump to an internal combustion engine;

a second channel that connects the fuel tank to the internal combustion engine without through the pressurizing pump; and a valve system that switches between a state where the fuel tank communicates with the first channel and a state where the fuel tank communicates with the second channel.

The invention claimed is:

1. An internal combustion engine system comprising:

an internal combustion engine;

at least one fuel tank that stores a fuel gas in a compressed state, wherein the at least one fuel tank comprises a first fuel tank and a second fuel tank;

a fuel gas pipe that connects the at least one fuel tank to the internal combustion engine;

at least one fuel tank on-off valve that is located at the at least one fuel tank and opens and closes an outlet port of the at least one fuel tank;

a pressurizing pump that pressurizes the fuel gas in the at least one fuel tank or in the fuel gas pipe;

processing circuitry configured to control the at least one fuel tank on-off valve;

a pressure reducing valve that is located at the fuel gas pipe and reduces a pressure of the fuel gas to a predetermined value or less;

a container connected to a portion of the fuel gas pipe which is located at a discharge side of the pressurizing pump, the container accumulating pressure energy of the fuel gas until a pressure of the fuel gas pressurized by the pressurizing pump exceeds a predetermined pressure;

a container valve that blocks movement of the fuel gas from the container to the internal combustion engine until the pressure of the fuel gas reaches the predetermined pressure, wherein the container includes an auxiliary tank, and the container valve includes an on-off valve controlled by the processing circuitry; or wherein the container includes an accumulator, and the container valve includes a check valve, wherein the fuel gas pipe includes:

an internal combustion engine channel extending from the at least one fuel tank toward the internal combustion engine; and a pump channel extending from the at least one fuel tank toward the pressurizing pump, wherein the internal combustion engine system further comprises a switching valve that is switchable between a state where the fuel gas from the at least one fuel tank flows toward the internal combustion engine channel and a state where the fuel gas from the at least one fuel tank flows toward the pump channel, and wherein the processing circuitry is configured to perform channel switching control of the switching valve before opening the at least one fuel tank on-off valve.

2. The internal combustion engine system according to claim 1, wherein the pressurizing pump pressurizes the fuel gas located upstream of the pressure reducing valve.

3. The internal combustion engine system according to claim 1, wherein the pressurizing pump is driven by utilizing energy generated by the internal combustion engine.

4. The internal combustion engine system according to claim 3, wherein the pressurizing pump is mechanically driven by the internal combustion engine.

5. The internal combustion engine system according to claim 1, wherein the accumulator is connected to the fuel gas pipe.

6. The internal combustion engine system according to claim 1, wherein the internal combustion engine system comprises:

a valve system that is operatable in a state where the at least one fuel tank communicates with the internal combustion engine channel or a state where the at least one fuel tank communicates with the pump channel, and the processing circuitry is configured to control the valve system.

7. The internal combustion engine system according to claim 6, wherein:

the processing circuitry determines which of a first internal pressure of the first fuel tank and a second internal pressure of the second fuel tank is lower; and the processing circuitry controls the valve system such that the fuel gas in one of the first fuel tank and the second fuel tank which has a lower internal pressure is guided to the pressurizing pump.

8. The internal combustion engine system according to claim 6, wherein:

the processing circuitry determines whether or not an internal pressure of the at least one fuel tank is less than a predetermined lower limit value; and the processing circuitry controls the valve system such that the fuel gas of the at least one fuel tank having the internal pressure that is less than the predetermined lower limit value is guided to the pressurizing pump.

9. The internal combustion engine system according to claim 1, wherein the fuel gas includes a hydrogen gas.

10. A vehicle comprising the internal combustion engine system according to claim 1, wherein the vehicle moves by driving power generated by the internal combustion engine system.

11. The vehicle according to claim 10, wherein:

the internal combustion engine system further includes a valve system that switches channels among the at least one fuel tank, the pressurizing pump, and the fuel gas pipe, wherein the processing circuitry includes first processing circuitry configured to control the valve system;

the processing circuitry further includes second processing circuitry configured to control equipment different from the valve system; and the first processing circuitry and the second processing circuitry are connected to each other so as to perform information communication therebetween.

12. The internal combustion engine system according to claim 1, further comprising a relief valve that makes a passage at the discharge side of the pressurizing pump and a passage at a suction side of the pressurizing pump communicate with each other when a pressure in the passage at the discharge side of the pressurizing pump exceeds a predetermined relief pressure.

13. The internal combustion engine system according to claim 1, wherein the pressurizing pump is driven by utilizing power supplied from the internal combustion engine, the internal combustion engine system further comprises a clutch that is located at a power transmitting path extending from the internal combustion engine to the pressurizing pump and switches between a power transmission state and a power disconnection state.

14. The internal combustion engine system according to claim 1, further comprising a user interface that presents information indicating that the fuel gas is being pressurized by the pressurizing pump.

15. An internal combustion engine system comprising:

an internal combustion engine;

a first fuel tank and a second fuel tank that store a fuel gas that is a hydrogen gas in a compressed state;

fuel gas piping that connects the first fuel tank and the second fuel tank to the internal combustion engine;

a pressurizing pump that pressurizes the fuel gas in the first fuel tank, the second fuel tank, or the fuel gas piping;

a pressure reducing valve that is located in the fuel gas piping and reduces a pressure of the fuel gas to a predetermined value or less;

a valve system that is operatable in a state where the first fuel tank or the second fuel tank communicates with an internal combustion engine channel included in the fuel gas piping, or a state where the first fuel tank or the second fuel tank communicates with a pump channel included in the fuel gas piping; and processing circuitry configured to control the valve system, wherein:

the internal combustion engine channel is a channel extending from the first fuel tank and the second fuel tank toward the internal combustion engine;

the pump channel is a channel extending from the first fuel tank and the second fuel tank toward the pressurizing pump; and the processing circuitry is configured to:

determine which of a first internal pressure of the first fuel tank and a second internal pressure of the second fuel tank is lower, and control the valve system such that the fuel gas in one of the first fuel tank and the second fuel tank which has a lower internal pressure is guided to the pressurizing pump, wherein the internal combustion engine system further comprises:

a container connected to a portion of the fuel gas piping which is located at a discharge side of the pressurizing pump, the container accumulating pressure energy of the fuel gas until a pressure of the fuel gas pressurized by the pressurizing pump exceeds a predetermined pressure; and a container valve that blocks movement of the fuel gas from the container to the internal combustion engine until the pressure of the fuel gas reaches the predetermined pressure, wherein the container includes an auxiliary tank, and the container valve includes an on-off valve controlled by the processing circuitry; or wherein the container includes an accumulator, and the container valve includes a check valve, wherein the fuel gas pipe includes:

the internal combustion engine channel extending from the at least one fuel tank toward the internal combustion engine; and the pump channel extending from the at least one fuel tank toward the pressurizing pump, wherein the internal combustion engine system further comprises a switching valve that is switchable between a state where the fuel gas from the first fuel tank or the second fuel tank flows toward the internal combustion engine channel and a state where the fuel gas from the first fuel tank or the second fuel tank flows toward the pump channel, and wherein the processing circuitry is configured to perform channel switching control of the switching valve before opening at least one fuel tank on-off valve located at at least one of the first fuel tank or the second fuel tank and opens and closes an outlet port of the at least one of the first fuel tank or the second fuel tank.

* * * * *